US012655332B2

(12) United States Patent
Li et al.

(10) Patent No.: US 12,655,332 B2
(45) Date of Patent: Jun. 16, 2026

(54) TWO-PART EPOXY-BASED STRUCTURAL ADHESIVE COMPOSITION

(71) Applicant: Henkel AG & Co. KGaA, Duesseldorf (DE)

(72) Inventors: Bin Li, Shanghai (CN); Yalong Qi, Shanghai (CN); Chunfu Chen, Kanagawa Prefecture (JP); Hongyu Chu, Shanghai (CN); Daoqiang Lu, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 82 days.

(21) Appl. No.: 18/211,399

(22) Filed: Jun. 19, 2023

(65) Prior Publication Data

US 2023/0332025 A1 Oct. 19, 2023

Related U.S. Application Data

(63) Continuation of application No. PCT/CN2020/137057, filed on Dec. 17, 2020.

(51) Int. Cl.

| | |
|---|---|
| ***C09J 163/00*** | (2006.01) |
| ***C09J 5/04*** | (2006.01) |
| ***C09J 5/06*** | (2006.01) |
| ***C09J 11/06*** | (2006.01) |
| ***C09J 177/00*** | (2006.01) |

(52) U.S. Cl.

CPC ............... *C09J 163/00* (2013.01); *C09J 5/04* (2013.01); *C09J 5/06* (2013.01); *C09J 11/06* (2013.01); *C09J 177/00* (2013.01)

(58) Field of Classification Search

None

See application file for complete search history.

(56) References Cited

U.S. PATENT DOCUMENTS

| | | | | |
|---|---|---|---|---|
| 11,542,418 | B2 | 1/2023 | Kakutaka et al. | |
| 12,060,505 | B2 | 8/2024 | Ma et al. | |
| 2005/0137357 | A1 | 6/2005 | Skoglund | |
| 2007/0293603 | A1 | 12/2007 | Shepherd et al. | |
| 2008/0124839 | A1 | 5/2008 | Saiki et al. | |
| 2011/0313082 | A1 | 12/2011 | Popp | |
| 2012/0029115 | A1 | 2/2012 | Wu et al. | |
| 2016/0017087 | A1* | 1/2016 | Lal | F16L 55/162 427/386 |
| 2016/0326300 | A1* | 11/2016 | Gelves | C09K 8/80 |
| 2018/0163104 | A1 | 6/2018 | Lutz et al. | |
| 2019/0071409 | A1* | 3/2019 | Kameyama | C08G 59/20 |

FOREIGN PATENT DOCUMENTS

| | | | |
|---|---|---|---|
| CN | 101818037 | A | 9/2010 |
| CN | 102911631 | A | 2/2013 |
| CN | 103409041 | A | 11/2013 |
| CN | 106947213 | A | 7/2017 |
| CN | 108300389 | A | 7/2018 |
| EP | 0323927 | A1 | 7/1989 |
| JP | 2007523969 | A | 8/2007 |
| JP | 2012518717 | A | 8/2012 |
| JP | 2014070221 | A | 4/2014 |
| JP | 2015182248 | A | 10/2015 |
| JP | 2018522963 | A | 8/2018 |
| JP | 2020132833 | A | 8/2020 |
| TW | 201700668 | A | 1/2017 |
| TW | 201920451 | A | 6/2019 |
| WO | 2005062801 | A2 | 7/2005 |
| WO | 2010099281 | A1 | 9/2010 |

OTHER PUBLICATIONS

CN108300389A_machine_translation (Year: 2018).*

PCT International Search Report issued in connection with International Application No. PCT/CN2020/137057 mailed on Sep. 23, 2021.

* cited by examiner

*Primary Examiner* — Michael N Orlando

*Assistant Examiner* — Abhishek A Patwardhan

(74) *Attorney, Agent, or Firm* — Steven C. Bauman

(57) ABSTRACT

The present invention relates to a two-part epoxy-based structural adhesive composition, comprising a first part and a second part, the first part comprising: i) a first aromatic difunctional epoxy resin having an epoxide equivalent weight (EEW) of less than 400 g/eq, ii) a second aromatic difunctional epoxy resin having an epoxide equivalent weight of from 400 g/eq to 3000 g/eq, and iii) a shell-core toughening agent; the second part comprising: I) a non-aromatic polyetheramide amine and II) an alicyclic amine. Moreover, the present invention also relates to a method for bonding substrates using the adhesive composition and an article bonded with the cured product of the adhesive composition and use of the composition in assembly of articles.

17 Claims, No Drawings

TWO-PART EPOXY-BASED STRUCTURAL ADHESIVE COMPOSITION

TECHNICAL FIELD

The present invention relates to a two-part epoxy-based structural adhesive composition, comprising a first part and a second part, the first part comprising: i) a first aromatic difunctional epoxy resin having an epoxide equivalent weight (EEW) of less than 400 g/eq, ii) a second aromatic difunctional epoxy resin having an epoxide equivalent weight of from 400 g/eq to 3000 g/eq, and iii) a shell-core toughening agent; the second part comprising: I) a non-aromatic polyetheramide amine and II) an alicyclic amine. Moreover, the present invention also relates to a method for bonding substrates using the adhesive composition and an article bonded with the cured product of the adhesive composition and use of the composition in assembly of articles.

BACKGROUND OF THE INVENTION

Structural adhesives are widely used in variety of applications, including general-use industrial applications and high-performance applications in the automotive and aerospace industrials. Typically, structural adhesives may be used to join substrates or parts together such as wood, metal, coated metal, plastics, filled plastics, fiberglass, screws, bolts, nails, staples, rivets, parts used in automobiles and so on.

Epoxy resin based structural adhesives are an important class of structural adhesives. Usually, epoxy-based structural adhesives are divided into either "one-part" or "two-part" formulations. In the one-part formulation, all components of the formulation, including the epoxy component and the curing agents, are formed into a single blend. Curing of the one-part adhesive is effected in most cases by exposing the formulation to elevated temperature. Because all of the reactive components are present in the one-part formulation, there is a tendency for the adhesive to cure prematurely, which can make it difficult to apply to a substrate. In extreme cases, the product becomes completely unusable. The two-part structural adhesives do not have the premature-curing problem.

Conventional epoxy-based structural adhesives normally have good shear adhesion strength but have poor peel adhesion strength due to their rigid, fragile structure.

Patent application CN101818037A discloses a two-part epoxy-based structural adhesive composition and a method for make the same, wherein incorporating CTBN-modified bisphenol A type epoxy resins and/or shell-core polymer toughened bisphenol A type epoxy resins into the epoxy component and using specific polyamides and specific polyetheramines in combination as the curing agent are proposed to improve the shear adhesion strength, and a highest shear strength of 22 Mpa can be reached, and a highest T-peel strength of 6.5 N/mm can be reached, which still have room to make improvement.

However, there still is a need to provide a structural adhesive having both high shear strength and high peel strength.

SUMMARY OF THE INVENTION

In one aspect of the present invention, it is provided a two-part epoxy-based, structural adhesive composition, which can achieve a high shear strength and a high peel strength, that is, achieve high peel strength without compromising the shear strength.

Specifically, the two-part epoxy-based structural adhesive of the present invention comprises a first part and a second part, the first part comprising: i) a first aromatic difunctional epoxy resin having an epoxide equivalent weight of less than 400 g/eq, ii) a second aromatic difunctional epoxy resin having an epoxide equivalent weight of from 400 g/eq to 3000 g/eq, and iii) a shell-core toughening agent; the second part comprising: I) a non-aromatic polyetheramide amine, and II) an alicyclic amine.

In another aspect of the present invention, it is provided a method for bonding substrates with the adhesive composition of the invention.

In still another aspect of the present invention, it is provided an article comprising a cured product of the adhesive composition of the invention.

In still another aspect of the present invention, it is provided use of the composition of the present invention in assembly of articles, in body frame construction, in architecture, or in household and industrial appliances.

The two-part epoxy-based structural adhesive composition according to the present invention can provide adhesives having both high shear strength and high peel strength.

DETAILED DESCRIPTION OF THE INVENTION

It is to be understood by one of ordinary skill in the art that the present discussion is a description of exemplary embodiments only and is not intended as limiting the broader aspects of the present invention. Each aspect so described may be combined with any other aspect(s) unless clearly indicated to the contrary. In particular, any feature indicated as being preferred or advantageous may be combined with any other feature or features indicated as being preferred or advantageous.

Unless specified otherwise, in the context of the present invention, the terms used are to be construed in accordance with the following definitions.

Unless specified otherwise, all wt. % or % by weight values quoted herein are percentages by weight.

Unless specified otherwise, as used herein, the terms "a", "an" and "the" include both singular and plural referents.

The terms "comprising" and "comprises" as used herein are synonymous with "including", "includes" or "containing", "contains", and are inclusive or open-ended and do not exclude additional, non-recited members, elements or process steps.

The term "consisting essentially of" as used herein means that the listed components constitute main body of the composition, for example, at least 70% by weight of the composition, at least 80% by weight of the composition, at least 85% by weight of the composition, or at least 90% by weight of the composition.

The term "consisting of" as used herein is close-ended and excludes additional, intentionally added members, elements or process steps.

The term "at least one" or "one or more" used herein to define a component refers to the type of the component, and not to the absolute number of molecules.

The terms "about", "around" and the like used herein in connection with a numerical value refer to the numerical value±10%, preferably ±5%. All numerical values herein should be interpreted as being modified by the term "about".

Unless specified otherwise, the recitation of numerical end points includes all numbers and fractions subsumed within the respective ranges, as well as the recited end points.

All references cited in the present specification are hereby incorporated by reference in their entirety.

Unless otherwise defined, all terms used in the present invention, including technical and scientific terms, have the meaning as commonly understood by one of the ordinary skilled in the art to which this invention belongs.

The epoxide equivalent weight (EEW) mentioned herein is determined according to ASTM D1652.

The Amine Hydrogen Equivalent Weight (AHEW) mentioned herein has conventional meaning in the art, that is, being calculated by dividing molecular weight by the number of active hydrogens.

Hereinafter the two-part epoxy-based structural adhesive composition will be described in detail.

The two-part epoxy-based structural adhesive composition comprising:

a first part comprising:

i) a first aromatic difunctional epoxy resin having an epoxide equivalent weight of less than 400 g/eq, preferably from 100 to 300 g/eq, such as from 110 to 250 g/eq, ii) a second aromatic difunctional epoxy resin having an epoxide equivalent weight of from 400 g/eq to 3000 g/eq, preferably from 410 to 2000 g/eq, such as from 420 to 1000 g/eq, from 430 to 600 g/eq, and iii) a shell-core toughening agent;

and a second part comprising:

i) a non-aromatic polyetheramide amine, and ii) an alicyclic amine.

The adhesive composition may consist of the above first part and the above second part.

The First Part

The term "first part" used herein does not intend to define the order of this part, but is used merely to name the part so as to be distinguished from other parts, such as the second part. In other words, the first part and the second part do not mean that they are provided in such an order, on the contrary, they can be provided in any order. Likewise, the term "second part" also does not intend to define the order of this part but to name the part so as to be distinguished from the first part. Alternatively, the first part may be called as "epoxy part" and the second part may be called as "curing agent part".

The first part comprises: i) a first aromatic difunctional epoxy resin having an epoxide equivalent weight of less than 400 g/eq, ii) a second aromatic difunctional epoxy resin having an epoxide equivalent weight of from 400 g/eq to 3000 g/eq, and iii) a shell-core toughening agent.

In the first part, a first aromatic difunctional epoxy resin, a second aromatic difunctional epoxy resin and a shell-core toughening agent are contained as essential components, wherein the first aromatic difunctional epoxy resin has an epoxide equivalent weight of less than 400 g/eq, preferably from 100 to 300 g/eq, such as from 110 to 250 g/eq, and the second aromatic difunctional epoxy resin has an epoxide equivalent weight of from 400 g/eq to 3000 g/eq, preferably from 410 to 2000 g/eq, such as from 410 to 1500 g/eq, from 420 to 1000 g/eq, from 430 to 800 g/eq, from 430 to 600 g/eq.

The first and second aromatic difunctional epoxy resins used herein independently refer to epoxy resins containing two epoxy radicals and containing at least one aromatic unit in the molecule (for example, in the backbone or in a side chain, if present, or in both backbone and side chain). Typically, the first and second aromatic difunctional epoxy resins include two epoxy groups, derived for example from glycidyl ethers, preferably at a terminal position of the resin backbone or side chain—if present.

Suitable first and second aromatic difunctional epoxy resins used herein include aromatic glycidyl ethers, for example, those that may be prepared by reacting a dihydric phenol (i.e. a phenol with another functional group having a reactive proton such as for example a hydroxyl group) with an excess of epichlorohydrin. Examples of useful dihydric phenols include resorcinol, catechol, hydroquinone, and bisphenols.

Preferably, the first and second aromatic difunctional epoxy resins used herein, independently from each other, are selected from bisphenol A epoxy resins (which are derived from bisphenol A and epichlorohydrin or are reaction products of bisphenol A and epichlorohydrin); bisphenol F epoxy resins (which are derived from bisphenol F and epichlorohydrin or are reaction products of bisphenol F and epichlorohydrin); bisphenol S epoxy resins (which are derived from bisphenol S and epichlorohydrin or are reaction products of bisphenol S and epichlorohydrin); phenol novolac epoxy resins (which are derived by reacting phenol with formaldehyde and then reacting with epichlorohydrin); cresol novolac epoxy resins (which are derived by reacting cresol with formaldehyde and then reacting with epichlorohydrin); tetrabromobisphenol A epoxy resins; tetrabromobisphenol F epoxy resins; and combinations thereof.

Without wishing to be bound by theories, it is believed that using difunctional epoxy resins will be helpful for achieving the beneficial technical effect of the present invention; and as shown in the following examples, including higher functional epoxy resins such as tetrafunctional epoxy resins cannot achieve the desired technical effect. Therefore, it is further preferred that the adhesive composition of the present invention does not contain trifunctional epoxy resins and/or tetrafunctional epoxy resins and/or higher functional epoxy resins.

Without wishing to be bound by theories, it is believed that using the above-mentioned two aromatic difunctional epoxy resins in combination is helpful for achieving the beneficial technical effect of the present invention. The first and second aromatic difunctional epoxy resins used herein may have the same or different building units, as long as the two epoxy resins have above defined EEWs. Meanwhile, as shown in the following examples, only one type aromatic epoxy resin cannot achieve desired effect of the present invention.

Without wishing to be bound by theories, it is believed that using the above-mentioned second aromatic difunctional epoxy resin having an EEW of from 400 to 3000 g/eq is helpful for achieving the beneficial technical effect of the present invention, and as shown in the following examples, an EEW value outside the above range will lead to inferior technical effect.

Suitable commercially available first aromatic difunctional epoxy resins include diglycidylether of bisphenol A, or of bisphenol F, for example, available under the tradenames "EPON 828", "EPON 862" from Hexion Specialty Chemicals, "DER-331," "DER-332," and "DER-334" from Dow Chemical; E51 and E44.

Suitable commercially available second aromatic difunctional epoxy resins include diglycidylether of bisphenol A, or of bisphenol F, for example, available under the tradename "D.E.R. 671" available from Dow Chemical.

The adhesive composition may comprise one or more above-mentioned first aromatic difunctional epoxy resins, and one or more above-mentioned second aromatic functional epoxy resins.

Preferably, the first aromatic difunctional epoxy resin is contained in the first part in an amount of 30 wt. % to 75 wt. %, preferably 35 wt. % to 70 wt. %, such as 37 wt. %, 39 wt. %, 40 wt %, 42 wt. %, 45 wt. %, 50 wt. %, 55 wt. %, 57 wt %, 60 wt. %, 62 wt. %, 65 wt. %, 67 wt. %, 68 wt. %, based on the total weight of the first part.

Preferably, the second aromatic difunctional epoxy resin is contained in the first part in an amount of 1 wt. % to 10 wt. %, such as 2 wt. %, 3 wt. %, 4 wt. %, 5 wt. %, 6 wt. %, 7 wt %, 8 wt. %, 9 wt. %, based on the total weight of the first part.

As the epoxy resin components, the first part can comprise the above-mentioned first and second aromatic difunctional epoxy resins only; alternatively, in addition to the above-mentioned first and second aromatic difunctional epoxy resins, the first part may also further optionally contain small amount of other difunctional epoxy resin(s) that is/are different from the above first and second aromatic difunctional epoxy resins, for example, less than 3 wt % or less than 1 wt % in relative to the first part, as long as said other difunctional epoxy resins do not do harm to the beneficial effect of the present invention.

The shell-core toughening agent used in the present invention can be core-shell polymers (or called as core-shell rubbers). A core-shell polymer means a polymer having a core-shell structure. Core-shell polymers are prepared by providing a core polymer onto which polymers forming the shell are grafted.

Typically, the core comprises or consists of a polymer selected from the group consisting of a butadiene polymer or copolymer, an acrylonitrile polymer or copolymer, an acrylate polymer or copolymer and combinations thereof. The polymers or copolymers may be cross-linked or not cross-linked. In some embodiments, the core polymers are cross-linked.

Onto the core is grafted one or more shell polymers. The shell polymer may be selected from the group consisting of a styrene polymer or copolymer, a methacrylate polymer or copolymer, an acrylonitrile polymer or copolymer, or combinations thereof. The thus created shell may be further functionalized with epoxy groups or acid groups. Functionalization of the shell may be achieved, for example, by copolymerization with glycidylmethacrylate or acrylic acid. In particular, the shell may comprise acetoacetoxy moieties in which case the amount of acetoacetoxy-functionalized polymer may be reduced, or it may be completely replaced by the acetoacetoxy-functionalized core/shell polymer.

The shell of suitable core-shell polymers may comprise a polyacrylate polymer or copolymer shell such as, for example, a polymethylmethacrylate shell. The polyacrylate shell, such as the polymethylmethacrylate shell, may not be cross-linked.

The core of suitable core-shell polymers may comprise a butadiene polymer or copolymer, a styrene polymer or copolymer, or a butadiene-styrene copolymer. The polymers or copolymers making up the core, such as a butadiene-styrene core, may be cross-linked.

Commercially available core/shell polymers may include, for example, those available under the tradename "KANE ACE" series, such KANE ACE MX154" from Kaneka.

Preferably, the shell-core toughening agent can be contained in the first part in an amount of 5 wt. % to 35 wt. %, preferably 10 wt. % to 30 wt. %, such as 12 wt. %, 15 wt. %, 18 wt. %, 20 wt. %, 22 wt. %, 25 wt. %, 27 wt. %, based on the total weight of the first part.

The Second Part

The second part of the present invention comprises, as essential components, a non-aromatic polyetheramide amine and an alicyclic amine.

The term "non-aromatic" used herein means that there is no aromatic group in the molecule.

The non-aromatic polyetheramide amines used herein contain an ether structure and an amide structure and one or two or more amino groups ($—NH_2$) in the molecule.

Preferably, said ether structure may comprise the unit of —(R—O—R')—, wherein R or R' independently is a linear or branched alkylene, such as $C_1$-$C_{10}$ alkylene, for example, methylene, ethylene, propylene, butylene, pentylene, hexylene and their isomers. Alternatively, the oxygen atom in the ether structure may be directly connected to the nitrogen atom of an amino group, especially a terminal amino group.

Preferably, said amide structure may comprise the unit of —C(═O)—NR"—, wherein R" can be H or an organic radical, such as alkyl, alkenyl, the ether structure mentioned above. Preferably, the amide structure constitutes no less than 50 wt. % of the non-aromatic polyetheramide amine.

Preferably, the non-aromatic polyetheramide amines useful herein have an amine hydrogen equivalent weight (AHEW) of no less than 150 g/eq, preferably no less than 180 g/eq, such as from 190 to 300 g/eq, from 200 to 270 g/eq.

Commercially available examples of the non-aromatic polyetheramide amines include Ancamide® 910 from Evonik Corporation.

The second part further contains an alicyclic amine as essential component. The alicyclic amines conventionally used in the art as a curing agent can be used in the present invention. Preferably, the alicyclic amine carries at least one alicyclic group such as five-member ring and six-member ring, and preferably, the alicyclic amine carries at least two $—NH_2$ groups, and preferably, the alicyclic ring in the alicyclic amine is a carbon ring without being interrupted by heteroatom.

Preferably, the alicyclic amines useful herein have an amine hydrogen equivalent weight (AHEW) of no less than 40 g/eq, preferably no less than 45 g/eq, such as no less than 50 g/eq.

For example, the alicyclic amines useful herein can be selected from 4,4'-diaminodicyclohexylmethane (PACM or HMDA), 4,4'-methylenebis(2-methylcyclohexanamine) (DMDC), isophorone diamine.

Without wishing to be bound by theories, it is believed that the presence of the alicyclic group in the amine curing agent is helpful for achieving the beneficial effect of the present invention, and also that it is important to use the above-mentioned polyetheramide amine and alicyclic amine in combination in order to achieve the desired effect of the present invention.

The second part may comprise one or more above-mentioned polyetheramide amines and one or more above-mentioned alicyclic amines.

Preferably, the polyetheramide amine is contained in the second part in an amount of from 30 to 80 wt %, preferably from 32 to 70 wt %, from 35 to 65 wt %, from 40 to 63 wt %, such as 45 wt. %, 50 wt. %, 55 wt. %, 60 wt. %, based on the total weight of the second part.

Preferably, the alicyclic amine is contained in the second part in an amount of from 10 to 45 wt %, preferably, from 15 to 43 wt %, from 20 to 40 wt %, such as 18 wt. %, 23 wt. %, 25 wt. %, 30 wt. %, 33 wt. %, 35 wt. %, based on the total weight of the second part.

In addition to the above-mentioned polyetheramide amine and alicyclic amine, the second part may preferably comprise an additional non-aromatic amine having an ANEW of no less than 35 g/eq, preferably no less than 40 g/eq, such as no less than 50 g/eq.

For example, said additional non-aromatic amine useful herein can be a polyetheramine. The non-aromatic polyetheramines used herein contain an ether structure and at least two —$NH_2$ groups. Preferably, said ether structure may be represented by the formula: —(R—O)$_n$—, wherein each R independently from each other is a linear or branched alkylene, such as C1-C10 alkylene, for example, methylene, ethylene, propylene, butylene, pentylene, hexylene and their isomers; n is in the range of 1 to 50, preferably from 1 to 20, more preferably from 1 to 10. In a preferred embodiment, the non-aromatic polyetheramines are derived from propylene oxide or ethylene oxide or their isomers, for example, have the structure of $H_2NCH(CH_3)CH_2$—($OCH_2CH(CH_3)$)$_n$—$NH_2$, wherein n is in the range of from 1 to 100, such as from 1 to 50, or from 1 to 20.

Commercially available additional non-aromatic amines include those under tradename JEFFMINE® D series such as D-230, D-400, JEFFMINE® ED series, JEFFMINE® T series, from Huntsman Corporation; and tradename ANCAMINE® 2914UF from Evonik.

In a preferred embodiment, one or more said additional non-aromatic amines can be contained in the second part in an amount of from 1 wt. % to 15 wt. %, such as 2 wt. %, 3 wt. %, 5 wt. %, 7 wt. %, 9 wt. %, 10 wt. %, 12 wt. %, based on the total weight of the second part.

The second part may comprise the above non-aromatic polyetheramide amine and the alicyclic amine and optionally the additional non-aromatic amine as the curing agents, or may consist essentially of, or consist of, the non-aromatic polyetheramide amine and the alicyclic amine and optionally the additional non-aromatic amine as the curing agents.

Meanwhile, it is preferred that an amine curing agent having an AHEW of less than 35 g/eq is not contained in the second part of the present invention.

Other Additives

The adhesive composition of the present invention may comprise one or more additives that are conventionally used in the art, such as, a filler, a reactive diluent, a pigment, a coupling agent, a surfactant, a catalyst and the like. The additives can perform serval functions, such as modifying the rheology of the adhesive in a desirable way, promoting cohesive, reducing overall cost per unit weight, absorbing moisture or oils from the adhesive or from a substrate to which it is applied.

The additive may be contained in the first part and/or the second part, as long as the additive does not react with the component(s) in the first part and/or the second part where it is contained. For example, the filler or pigment or surfactant can be contained in the first part only, in the second part only, or in both the first part and the second part.

Fillers

Fillers may optionally be added to the structural adhesives to, for example, promote adhesion, improve corrosion resistance, control the rheological properties of the adhesive, and/or reduce shrinkage during curing.

Examples of these fillers include, but are not limited to, calcium carbonate, calcium oxide, talc, carbon black, textile fibers, glass particles or fibers, aramid pulp, boron fibers, carbon fibers, mineral silicates, mica, powdered quartz, hydrated aluminum oxide, bentonite, wollastonite, kaolin, fumed silica, precipitated silica, amorphous silica, silica aerogel, metal powders such as aluminum powder or iron powder, calcium silicates, phosphates, molybdates, aluminum-trihydrates, hollow-glass-microspheres, polymeric microspheres and the like.

Examples of the commercially available fillers include those sold under tradenames Carbosil®, such as Cabosil TS 720, Carbosil M5 from Cabot Corporation, BYK 410 from BYK-Chemie GmbH, Talc DH 600B from Yingkou Dahai talc mining Ltd.

The filler may be contained in the structural adhesive of the present invention in an amount of from 1 wt. % to 20 wt. %, preferably from 2 wt % to 15 wt %, such as 3 wt %, 4 wt. %, 5 wt. %, 7 wt. %, 9 wt. %, 10 wt. %, 12 wt. %, based on the total weight of the adhesive composition.

Reactive Diluents

Reactive diluents may optionally be added to control the flow characteristics of the adhesive composition. Suitable diluents can have at least one reactive terminal end portion and. Reactive terminal end portions include glycidyl ether.

Examples of suitable diluents include but are not limited to aliphatic di-/tri-glycidyl ethers and aromatic di-/tri-glycidyl ethers, such as diglycidyl ether of resorcinol, diglycidyl ether of cyclohexane dimethanol, diglycidyl ether of neopentyl glycol, triglycidyl ether of trimethylolpropane.

Commercially available reactive diluents are for example Heloxy® Modifier 68, Heloxy® Modifier 48 available from Hexion Specialty Chemicals.

The reactive diluents may be contained in the first part in an amount of from 1 wt. % to 25 wt. %, preferably from 2 wt. % to 20 wt. %, such as 3 wt. %, 4 wt. %, 5 wt. %, 6 wt. %, 7 wt. %, 8 wt. %, 9 wt. %, 10 wt. %, 11 wt %, 12 wt. %, 15 wt. %, 17 wt. %, based on the total weight of the first part.

Colorants

Colorants that are conventionally used in the art may optionally be contained in the structural adhesive composition of the present invention. Examples of the colorants include but are not limited to inorganic or organic colorants, such as ferric oxide, brick dust, carbon black, titanium oxide, bromothymol blue, brilliant blue, phenothalin and the like.

Coupling Agents

Coupling agent(s) that are conventionally used in the art may optionally be contained in the structural adhesive composition of the present invention, preferably in the first part of the composition. Examples of the coupling agents include silane coupling agents. Commercially available coupling agents include for example Silquest A 187, CoatOSil MP 200 from Momentive.

Surfactants

Surfactants may optionally be added to the structural adhesive to assist with oil displacement on a substrate. Any surfactant that is soluble within the adhesive formulation may be used, including ionic surfactants, anionic surfactants, nonionic surfactants and zwitterionic surfactants. Exemplary surfactants include triproylene glycol monomethyl ether and polyethylene sorbitol.

Catalysts

Structural adhesives of the present invention may optionally comprise a metal salt catalyst in a catalytic amount. Suitable catalysts which are useable in the present compositions include the group I metals (e.g., lithium), group II metals (e.g., calcium and magnesium) or lanthanoid salts (e.g., lanthanum) wherein the anion is selected from nitrates, iodides, thiocyanates, triflates, alkoxides, perchlorates and sulfonates. Exemplary metal salts include lanthanum nitrate, lanthanum triflate, lithium iodide, lithium nitrate, calcium nitrate and their corresponding hydrates.

Preparation of Structural Adhesive

The first part is prepared by mixing all ingredients in the first part together, where applicable, by heating. The second part is prepared by mixing all ingredients in the second part together. The first part and the second part are stored separately before use.

The structural adhesive is prepared by mixing the first part and the second part of the present invention shortly before use. The mixing can be done manually, or by any conventional means, either at room temperature or at elevated temperature, so as to form a uniform curable composition. The first part and the second part can be mixed in a weight ratio of from 10:1 to 1:5, such as from 5:1 to 1:3, or from 3:1 to 1:1, especially 2:1 or 1:1.

Preferably, the first part is mixed with the second part in such way that the epoxy group in the first part and the active hydrogen in the second part are used in a molar ratio of from 0.5:1 to 3:1, such as from 2:1, especially of about 1:1.

Curing preferably is carried out at room temperature (RT, about 25° C.), but can also be carried out at elevated temperature, such as no more than 80° C., or no more than 60° C.

Bonding Substrates with the Adhesive Composition

Another object of the present invention is to provide a method for bonding substrates with the adhesive composition of the present invention, the method comprising:

- providing a first substrate;
- mixing the first part and the second part as described above shortly before use so as to form a mixture,
- applying the mixture to the first substrate;
- bonding a second substrate to the side of the first substrate on which the mixture is applied, wherein the second substrate is optionally applied with the mixture; and
- curing the mixture, optionally with heating.

The adhesive composition of the present application can be applied between two substrates and cured so as to form a bonded joint between the substrates. The adhesive composition may be used to supplement or completely eliminate a weld or mechanical fastener. Suitable substrates onto which the adhesive of the present invention may be applied include metals (such as steels, stainless steels, carbon steels, iron, copper, aluminum, zinc, etc., including alloys thereof), carbon fibers, glass fibers, glass, woods, plastics, woven materials, non-woven materials, and mixtures thereof. In some embodiments, at least one of the substrates is a metal. In other embodiments, both substrates are metals.

The surfaces of the substrates may be preferably cleaned prior to application of the structural adhesive. In bonding areas, the adhesive may be applied as a liquid, paste, or semi-solid, and can be applied as a continuous bead, stripes, or any other geometrical form that can conform to forming a useful bond.

The adhesive composition of the present invention may be used as structural adhesives in vehicle assembly, such as the assembly of watercraft vehicle, aircraft vehicles or motorcraft vehicles, such as cars, motor bikes or bicycles. Further, the adhesive composition may be used in body frame construction, in architecture, or in household and industrial appliances.

EXAMPLES

The invention will now be described by way of the following examples. The following examples are intended to assist one skilled in the art to better understand and practice the present invention. The scope of the invention is not limited by the examples but is defined in the appended claims. All parts and percentages are based on weight unless otherwise stated.

Materials used in the Examples:

| | |
|---|---|
| D.E.R. 671 | Solid difunctional epoxy resin, derived from bisphenol A and epichlorohydrin, having an EEW of 475-550 g/eq, available from Dow |
| Epon 828 | Liquid difunctional epoxy resin, derived from bisphenol A and epichlorohydrin, having an EEW of 185-192 g/eq, available from Hexion |
| Epon 862 | Liquid difunctional epoxy resin, derived from bisphenol F and epichlorohydrin, having an EEW of 165-173 g/eq, available from Hexion |
| Struktol VP 3619 | Liquid nitrile rubber modified difunctional epoxy prepolymer based on bisphenol-A-diglycidyl ether, having an EEW of about 310 g/eq, available from Struktol |
| Prepo 2000LV | Liquid difunctional epoxy resin synthetized from Epon 828 and Jeffamine D 2000, having an EEW of about 450 g/eq |
| jER 1256K | Solid difunctional bisphenol A epoxy resin, having an EEW of about 7800 g/eq, available from Mitsubishi Chemical |
| jER 4010P | Solid difunctional bisphenol F epoxy resin, having an EEW of 3800-4600 g/eq, available from Mitsubishi Chemical |
| Araldite MY 721 | Tetrafunctional aromatic epoxy resin, having an EEW of 109-116 g/eq, available from Ciba Specialty Chemicals |
| EPU-78-11 | Liquid difunctional PU modified aromatic epoxy resin, having an EEW of 220-240 g/eq, available from ADEKA |
| Stantone 25 04 | Liquid difunctional bisphenol A epoxy resin, having an EEW of about 190, available from Polyone |
| Kane Ace MX 154 | Core-shell rubber (CSR) in bisphenol A epoxy resin, having a CSR content of about 40 wt % and an EEW of about 301 g/eq, available from Kaneka |
| Heloxy Modifier 68 | Diglycidyl ether of neopentyl glycol, reactive diluent, available from Hexion |
| Heloxy Modifier 48 | An aliphatic triglycidyl ether, reactive diluent, available from Hexion |
| Ancamide 910 | Non-aromatic polyetheramide amine curing agent, having an AHEW of 230, from Evonik |

-continued

| | |
|---|---|
| Jeffamine D-230 | Non-aromatic polyetheramine curing agent, having an AHEW of 60, from Hunstman. |
| Ancamine 2678 | Aliphatic amine curing agent, having an AHEW of 30, from Evonik |
| Ancamine 2914UF | Aliphatic amine curing agent, having an AHEW of 230, from Evonik |
| PACM | 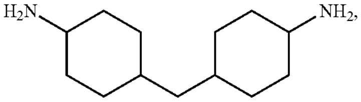, having an AHEW of about 52.5 |
| Silquest A 187 | Silane coupling agent, available from Momentive |
| CoatOSil MP 200 | Silane coupling agent, available from Momentive |
| DH-600B | Talc powder, available from Yingkou Dahai Talc Mining Ltd., China |
| Cabosil TS 720 | Fumed silica, available from Cabot |
| Cabosil M5 | Fumed silica, available from Cabot |

Lap Shear Strength Test

The lap shear strength was tested according to ASTM D1002 entitled “Standard Test Method for Apparent Sheer Strength of Single Lamp Joint Adhesively Bonded Metal Specimens by Tension Loading (Metal To Metal)”, and the test samples were prepared according to ASTM D1002. Carbon steels were used as substrates and the thickness of the applied adhesive was about 0.2 mm.

T-Peel Strength Test

The T-Peel strength was tested according to ASTM D 1876 entitled “Standard Test Method for Peel Resistance of Adhesives (T-Peel Test)”, and the test samples were prepared according to ASTM D 1876. Carbon steels were used as substrates and the thickness of the applied adhesive was about 0.2 mm.

Examples and Comparative Examples

Adhesive formulations were prepared with the components listed in the following Tables 1-3 and were tested according to the above-mentioned methods.

Part 1 of the adhesives was prepared by mixing all components of part 1 by stirring and then applying vacuum for degassing so as to obtain a degassed mixture as part 1, and then was stored in a container.

Part 2 of the adhesives was prepared by mixing all components of part 2 by stirring and then applying vacuum for degassing so as to obtain a degassed mixture as part 2, and then was stored in another container different from part 1.

When applying the adhesive, part 1 and part 2 were extruded out from their containers and pass through a static mixer together in a specific ratio so as to apply the formed adhesive onto a substrate.

TABLE 1

| | Components | Ex. 1 (wt %) | CE 1 (wt %) | CE 2 (wt %) | CE 3 (wt %) | CE 4 (wt %) | CE 5 (wt %) | CE 6 (wt %) |
|---|---|---|---|---|---|---|---|---|
| Part 1 | Epon 828 + D.E.R. 671 (8:2 weight ratio) | 20 | | | | 20 | 20 | 20 |
| | Epon 862 | 20 | 20 | 20 | 30 | 20 | 20 | 20 |
| | Struktol VP 3619 | | | 20 | | | | |
| | Prepo 2000LV | | | | 10 | | | |
| | MY 721 | | | | | 5 | | |
| | Kane Ace MX154 | 40 | 60 | 40 | 40 | 32 | 40 | 40 |
| | Heloxy modifier 68 | 9.0 | 9.0 | 9.0 | 9.0 | 5.0 | 9.0 | 9.0 |
| | Silquest A 187 | 1.0 | 1.0 | 1.0 | 1.0 | 1.0 | 1.0 | 1.0 |
| | DH-600B | 7.5 | 7.5 | 7.5 | 7.5 | 15.5 | 7.5 | 7.5 |
| | Cabosil TS 720 | 2.5 | 2.5 | 2.5 | 2.5 | 1.5 | 2.5 | 2.5 |
| | Total of Part 1 | 100 | 100 | 100 | 100 | 100 | 100 | 100 |
| Part 2 | Ancamide 910 | 55 | 55 | 55 | 55 | 55 | 59 | 60 |
| | Jeffamine D-230 | 10 | 10 | 10 | 10 | 10 | 10 | |
| | PACM | 25 | 25 | 25 | 25 | 25 | 16 | 25 |
| | Ancamine 2678 | | | | | | 5 | 5 |
| | DH-600B | 5.0 | 5.0 | 5.0 | 5.0 | 5.0 | 5.0 | 5.0 |
| | Cabosil TS 720 | 5.0 | 5.0 | 5.0 | 5.0 | 5.0 | 5.0 | 5.0 |
| | Total of Part 2 | 100 | 100 | 100 | 100 | 100 | 100 | 100 |
| | Part 1: Part 2 (by weight) | 2:1 | 2:1 | 2:1 | 2:1 | 2:1 | 2:1 | 2:1 |
| | Lap shear strength, Cured at RT, 2 days, Mpa | 22.29 | 18.02 | 15.16 | 18.97 | 13.16 | 16.38 | 16.20 |
| | T-peel strength, Cured at RT, 2 days, N/25 mm | 200.58 | 203.17 | 180.23 | 211.67 | 136.50 | 128.08 | 129.58 |

TABLE 2

| | Components | Ex. 2 (wt %) | Ex. 3 (wt %) | Ex. 4 (wt %) | Ex. 5 (wt %) | Ex. 6 (wt %) | Ex. 7 (wt %) | Ex. 8 (wt %) |
|---|---|---|---|---|---|---|---|---|
| Part 1 | Epon 828 + D.E.R. 671 (8:2 weight ratio) | 24.0 | 24.0 | 24.0 | 13.0 | | | |
| | Epon 828 + D.E.R. 671 (7:3 weight ratio) | | | | | 28.0 | | |
| | Epon 862 + D.E.R. 671 (8:2 weight ratio) | | | | | | 14.0 | 14.0 |
| | Stantone 25 04 | | | | | | | 0.3 |
| | Epon 862 | 15.0 | 15.0 | 15.0 | 15.0 | 15.0 | 15.0 | |
| | Kane Ace MX154 | 45 | 45 | 45 | 60.0 | 45.0 | 59.0 | 58.2 |
| | Heloxy modifier 68 | 6.0 | 6.0 | 6.0 | 6.0 | 6.0 | 6.0 | |
| | Heloxy modifier 48 | | | | | | | 18.0 |
| | Epon 828 + Brilliant Blue (9:1 by weight) | 1.0 | 1.0 | 1.0 | | | | |
| | Silquest A 187 | 1.0 | 1.0 | 1.0 | 1.0 | 1.0 | 1.0 | 1.0 |
| | DH-600B | 6.0 | 6.0 | 6.0 | 4.0 | 4.0 | 4.5 | 6.0 |
| | Cabosil TS 720 | 2.0 | 2.0 | 2.0 | 1.0 | 1.0 | 0.5 | 2.5 |
| | Total of Part 1 | 100 | 100 | 100 | 100 | 100 | 100 | 100 |
| Part 2 | Ancamide 910 | 52.0 | 54.0 | 55.0 | 54.0 | 54.0 | 54.0 | 50.0 |
| | PACM | 33.0 | 33.0 | 35.0 | 33.0 | 33.0 | 33.0 | 30.0 |
| | Ancamine 2914UF | 5.0 | 3.0 | | 3.0 | 3.0 | 3.0 | 5.0 |
| | DH-600B | 4.0 | 4.0 | 4.0 | 6.0 | 6.0 | 6.0 | 4.0 |
| | Cabosil TS 720 | 6.0 | 6.0 | 6.0 | 3.8 | 3.8 | 3.8 | 3.0 |
| | Cabosil M5 | | | | | | | 3.0 |
| | BYK 410 | | | | | | | 3.0 |
| | Phenothalin | | | | 0.2 | 0.2 | 0.2 | |
| | Ancamide 910 + Brilliant Blue (9:1 by weight) | | | | | | | 0.5 |
| | Glass bead | | | | | | | 1.5 |
| | Total of Part 2 | 100 | 100 | 100 | 100 | 100 | 100 | 100 |
| | Part 1: Part 2 (by weight) | 2:1 | 2:1 | 2:1 | 2:1 | 2:1 | 2:1 | 2:1 |
| | Lap shear strength, Cured at RT, 2 days, Mpa | 28.97 | 27.48 | 26.50 | 26.15 | 24.07 | 33.69 | 26.82 |
| | T-peel strength, Cured at RT, 2 days, N/25 mm | 227.67 | 217.58 | 222.58 | 279.67 | 258.33 | 254.67 | 230.67 |

TABLE 3

| | Components | CE 7 (wt %) | CE 8 (wt %) | CE 9 (wt %) |
|---|---|---|---|---|
| Part 1 | Epon 828 + Stantone 25 04 (1:1 weight ratio) | 0.3 | 0.3 | 0.3 |
| | Epon 862 + JER 1256K (8:2 weight ratio) | | 14.0 | |
| | Epon 862 + jER 4010P (8:2 weight ratio) | | | 14.0 |
| | EPU-78-11 | 14.0 | | |
| | Epon 862 | 9.0 | 9.0 | 9.0 |
| | Kane Ace MX154 | 58.2 | 58.2 | 58.2 |
| | Heloxy modifier 48 | 12.0 | 11.0 | 11.0 |
| | Silquest A 187 | 1.0 | | |
| | CoatOsil MP 200 | | 2.0 | 2.0 |
| | DH-600B | 3.0 | 3.0 | 3.0 |
| | Cabosil TS 720 | 2.5 | 2.5 | 2.5 |
| | Total of Part 1 | 100 | 100 | 100 |
| Part 2 | Ancamide 910 | 50.45 | 50.45 | 50.45 |
| | PACM | 30.0 | 30.0 | 30.0 |
| | Ancamine 2914UF | 5.0 | 5.0 | 5.0 |
| | DH-600B | 7.0 | 7.0 | 7.0 |
| | Cabosil M5 | 6.0 | 6.0 | 6.0 |
| | Brilliant Blue | 0.05 | 0.05 | 0.05 |
| | Glass bead | 1.5 | 1.5 | 1.5 |
| | Total of Part 2 | 100 | 100 | 100 |
| | Part 1: Part 2 (by weight) | 2:1 | 2:1 | 2:1 |
| | Lap shear strength, Cured at RT, 2 days, Mpa | 28.37 | 27.57 | 28.30 |

In the present application, the tested T-peel strength of no less than 180 N/25 mm is acceptable, and no less than 190 N/25 mm is desirable; and meanwhile, the tested lap shear strength of more than 20 Mpa is desirable.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A two-part epoxy-based structural adhesive composition comprising:

a first part comprising:

i) a first aromatic difunctional epoxy resin having an epoxide equivalent weight of less than 400 g/eq, comprising a bisphenol F epoxy resin and another epoxy resin, ii) a second aromatic difunctional epoxy resin having an epoxide equivalent weight of from 400 g/eq to 3000 g/eq, and iii) a shell-core toughening agent;

and a second part comprising:

I) a non-aromatic polyetheramide amine, and

II) an alicyclic amine, wherein the second aromatic difunctional epoxy resin is present in the first part in an amount of 1 wt. % to 10 wt. % based on the total weight of the first part.

2. The composition according to claim 1, wherein the first aromatic difunctional epoxy resin and the second aromatic difunctional epoxy resin independently from each other are selected from bisphenol A epoxy resins; bisphenol F epoxy resins; bisphenol S epoxy resins; phenol novolac epoxy resins; cresol novolac epoxy resins; tetrabromobisphenol A epoxy resins; tetrabromobisphenol F epoxy resins; and combinations thereof.

3. The composition according to claim 1, wherein the first aromatic difunctional epoxy resin is contained in the first part in an amount of 30 wt. % to 75 wt. % based on the total weight of the first part.

4. The composition according to claim 1, wherein the shell-core toughening agent is contained in the first part in an amount of 5 wt. % to 35 wt. % based on the total weight of the first part.

5. The composition according to claim 1, wherein the non-aromatic polyetheramide amine has an amine hydrogen equivalent weight of no less than 150 g/eq.

6. The composition according to claim 1, wherein the alicyclic amine has an amine hydrogen equivalent weight of no less than 40 g/eq.

7. The composition according to claim 1, wherein the alicyclic amine is selected from 4,4'-diaminodicyclohexylmethane (PACM), 4,4'-methylenebis(2-methylcyclohexanamine) (DMDC) and isophorone diamine.

8. The composition according to claim 1, wherein the second part further comprises an additional non-aromatic amine having an amine hydrogen equivalent weight of no less than 35 g/eq.

9. The composition according to claim 1, wherein the non-aromatic polyetheramide amine contains an ether structure, an amide structure and one or two or more amino groups.

10. The composition according to claim 1, wherein the weight ratio of the first part to the second part is in the range of 10:1 to 1:5.

11. The composition according to claim 1, wherein the molar ratio of the epoxy groups in the first part to the active hydrogen in the amines of the second part is in the range from 0.5:1 to 3:1.

12. The composition according to claim 1, wherein the polyetheramide amine is contained in the second part in an amount of from 30 to 80 wt % based on the total weight of the second part.

13. The composition according to claim 1, wherein the alicyclic amine is contained in the second part in an amount of from 10 to 45 wt % based on the total weight of the second part.

14. The composition according to claim 8, wherein the additional non-aromatic amine curing agent is contained in the second part in an amount of from 1 wt. % to 15 wt. % based on the total weight of the second part.

15. The composition according to claim 1, further comprising one or more additives selected from a filler, a reactive diluent, a pigment, a coupling agent, a surfactant, and a catalyst.

16. A method for bonding substrates, comprising:
providing a first substrate;
mixing the first part and the second part as defined in claim 1 shortly before use so as to form a mixture;
applying the mixture to the first substrate;
bonding a second substrate to the side of the first substrate on which the mixture is applied, wherein the second substrate is optionally applied with the mixture; and
curing the mixture, optionally with heating.

17. The method according to claim 16, wherein the first substrate and the second substrate independently from each other are selected from metals, such as steels, stainless steels, carbon steels, iron, copper, aluminum, zinc, etc., including alloys thereof; carbon fibers; glass fibers; glass; woods; plastics; woven materials; non-woven materials; and mixtures thereof.

* * * * *